United States Patent [19]

Smith

[11] Patent Number: 4,628,955

[45] Date of Patent: Dec. 16, 1986

[54] EXTERNALLY APPLIED VALVE FOR WATER LINES

[76] Inventor: Thomas D. Smith, 11228 Eastern St., Kansas City, Mo. 64134

[21] Appl. No.: 798,409

[22] Filed: Nov. 15, 1985

[51] Int. Cl.⁴ .............................................. F16K 43/00
[52] U.S. Cl. .................................... 137/318; 137/321;
138/94; 251/195; 251/203; 285/197; 285/421;
403/324; 403/374
[58] Field of Search ................ 137/318, 321; 138/89,
138/97, 93, 94, 94.3; 251/193, 194, 195, 203;
285/197, 373, 419, 421; 403/318, 319, 324, 374;
29/157.1 R, 213 R, 213 E

[56] References Cited

U.S. PATENT DOCUMENTS

| | | | |
|---|---|---|---|
| 494,580 | 4/1893 | Lunkeheimer | 251/203 |
| 1,647,734 | 11/1927 | Kelly | 137/244 |
| 2,797,063 | 6/1957 | Hobbs | 251/193 |
| 3,194,269 | 7/1965 | Williams | 251/203 |
| 3,345,088 | 10/1967 | Nagle | 285/421 |
| 3,478,771 | 11/1969 | Johnson | 137/242 |
| 3,532,113 | 10/1970 | McKean | 137/318 |
| 3,687,166 | 8/1972 | Herrin | 137/318 |
| 4,165,858 | 8/1979 | Thackrey | 251/194 |
| 4,552,170 | 11/1985 | Margrave | 137/318 |

Primary Examiner—George L. Walton
Attorney, Agent, or Firm—Kokjer, Kircher, Bradley, Wharton, Bowman & Johnson

[57] ABSTRACT

A valve which can be applied to a water pipe while the pipe remains in service. The body of the valve is formed in two sections which can be applied to the outside surface of the water pipe and secured together in precise alignment with one another by tapered pins. A reciprocating gate which forms the valve element is bifurcated and includes a pair of gate sections carrying knife edges which cut through the pipe wall when the gate is initially moved to its closed position. This cuts away a ring from the water pipe and permits the gate to function to control water flow through the valve. The scrap ring which is cut away from the pipe is forced by the gate into a cavity disposed out of the flow line. The gate crushes the ring against a complemental convex surface of the cavity. Camming interaction between the leading ends of the gate sections and the convex surface mechanically forces the gate sections away from one another to press them firmly against the valve seats when the gate is fully closed. The gate sections are continuously urged apart by internal spring pressure so the minerals and other deposits are scraped from the valve seats by the knife edges each time the gate is opened or closed.

2 Claims, 4 Drawing Figures

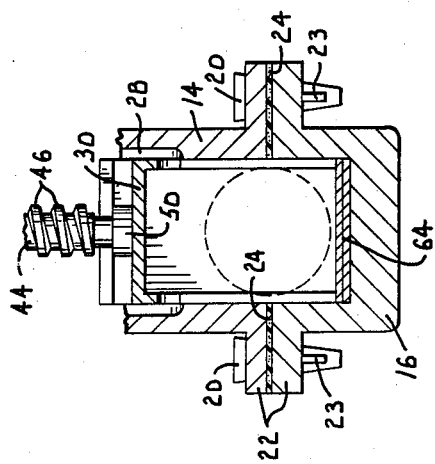
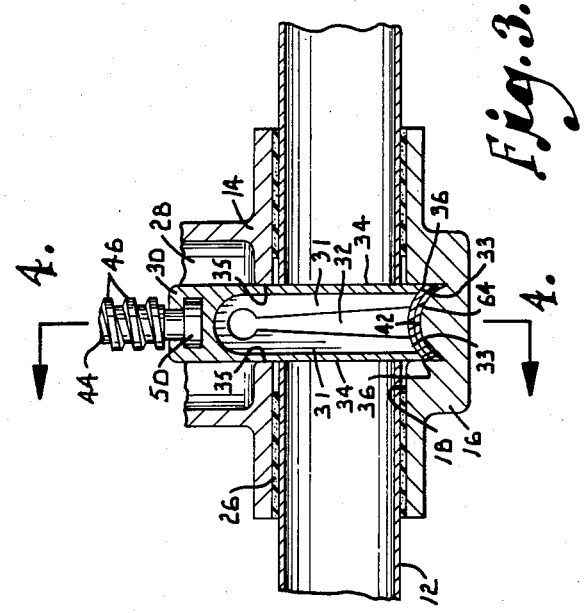
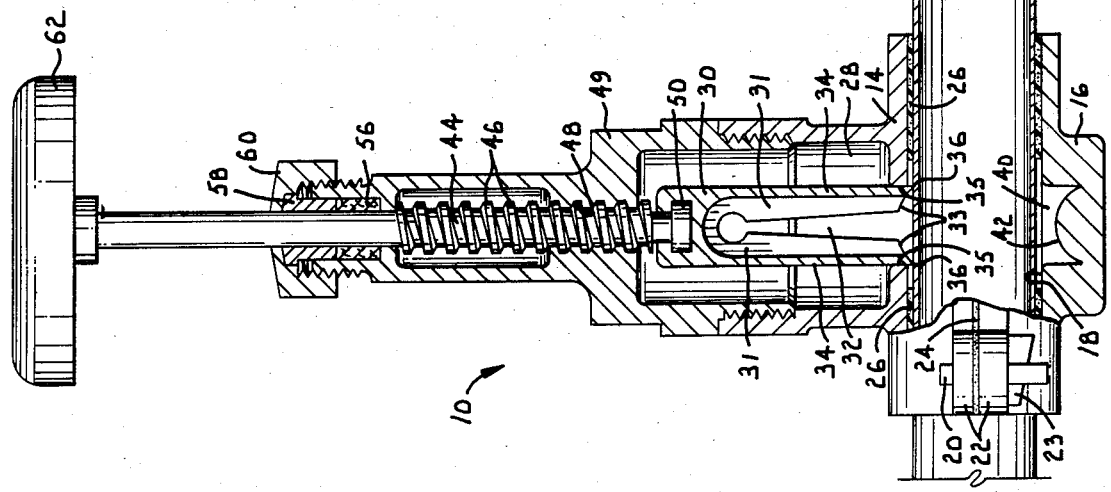
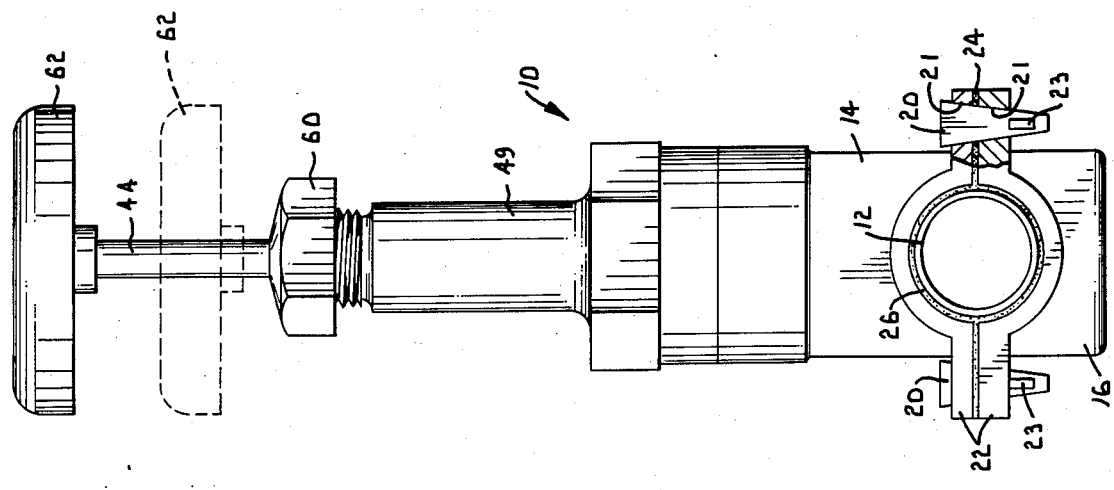

EXTERNALLY APPLIED VALVE FOR WATER LINES

BACKGROUND OF THE INVENTION

This invention relates generally to the field of valves and more particularly to a valve which can be installed on a fluid line while the line remains in service to carry fluid.

Fresh water is typically distributed in buildings through copper or plastic tubing. In order to install a valve on a water line which is already in place, it is necessary to first close a valve which is located upstream from the area of the pipe to which the new valve is to be applied. The pipe must then be drained, and a section must be cut away to provide room for installation of the new valve. The free ends of the pipe are fitted in the opposite ends of the valve body and are soldered, glued, solvent welded or otherwise secured and sealed to the pipe. In the case of copper pipe, soldering is normally used, while solvent welding is used for plastic pipe. Screw threads, bell couplings, flanged connections, and other techniques are also used at times.

In all cases, it is necessary for the water supply to be cut off and for the pipe to be drained. As a consequence, water service must be removed from the pipe and all of the appliances and facilities it serves. The water service must remain off until installation of the valve has been completed, and this can take a considerable amount of time and can result in considerable inconvenience to the building occupants. Installation of the valve also requires a skilled worker who must shut off the water supply, drain the water line, cut the correct section of the pipe away, install the valve in the removed section of the pipe, solder or solvent weld the valve body to the pipe, and then turn the water back on again once the valve has been installed. The skills required ordinarily are those of a trained and experienced plumber.

Another problem is that a valves on water pipes and other fluid lines can remain open for extended periods of time, thus exposing the valve seats to minerals in the water or other fluids. Calcium and other deposits can build up on the seats to such an extent that they do not permit the valve to seat properly when closed. Consequently, the valve leaks as a result of mineral build-up on the valve seats.

In refrigeration systems and other fluid systems which contain relatively expensive fluids, component replacement often requires complete draining of the system which can result in loss of expensive fluid. For example, when a refrigeration compressor is to be replaced, the refrigerant must be drained before the old compressor is removed, and the system must be charged with new refrigerant after installation of the new compressor has been completed. In view of the increasing lost of refrigerant, the need to recharge the system can result in significant expense.

SUMMARY OF THE INVENTION

The present invention is directed to a valve which is specially constructed in order to permit its installation on a fluid line while the line remains unsevered and in service. In accordance with the invention, a two part valve body is applicable to the outside surface of a fluid line such as a copper pipe which contains a supply of fresh water under pressure. Tapered pins or other fasteners secure the sections of the valve body together on the pipe in precise alignment with one another, and the body sections are sealed to one another and to the water line by gaskets or other sealing means such as glue or smoothly machined surfaces on the parts.

The valve is equipped with a specially constructed gate which is carried on a valve stem and which can be reciprocated to open and close the valve. The gate includes two gate sections each having on its lower or leading end a sharp knife edge which shears the pipe wall when the gate is initially advanced to the closed position by turning the stem. The cutting edges of the gate sever a ring from the water pipe, and the ring is progressively pushed by the gate into a specially shaped cavity in the valve body. As the gate approaches the fully closed position, it crushes the ring against an internal surface of the valve body so that the scrap which is removed from the pipe remains out of the water flow path and does not obstruct either the water flow or the operation of the gate. At the same time, the leading ends of the gate sections encounter a camming surface which acts to mechanically press the gate sections against their seats to assure a tight closure of the valve.

It is a particularly important feature of the invention that the valve can be installed while the water line remains in service to direct water to the appliances it supplies. Consequently, the inconvenience of taking the water line out of service while the valve is being installed is avoided. At the same time, the valve of the present invention can be easily installed by persons lacking plumbing skills, and its installation can be carried out more quickly than in the case of a conventional valve which requires cutting of the pipe and soldering or solvent welding of the valve. The gate sections are constantly urged apart so that the knife edges scrape against the valve seats each time the gate is opened or closed. This causes minerals and other deposits which may build up on the valve seats to be scraped away so as not to interfere with proper seating of the gate.

DESCRIPTION OF THE DRAWING

In the accompanying drawing which forms a part of the specification and is to be read in conjunction therewith and in which like reference numerals are used to indicate like parts in the various views:

FIG. 1 is an end elevational view showing a valve constructed in accordance with a preferred embodiment of the present invention installed on to a water pipe;

FIG. 2 is a side elevational view of the valve installed on the water pipe and showing the condition of the water pipe prior to initial closing of the gate with portions of the valve shown in cross section for purposes of illustration;

FIG. 3 is a fragmentary sectional view similar to FIG. 2, but showing the gate after it has been initially closed to sever the water pipe; and FIG. 4 is a fragmentary sectional view taken generally along line 4—4 of FIG. 3 in the direction of the arrows.

DETAILED DESCRIPTION OF THE INVENTION

Referring now to the drawing in more detail and initially to FIGS. 1 and 2, numeral 10 generally designates a valve constructed in accordance with a preferred embodiment of the present invention. The valve 10 may be installed on a fluid line such as a rigid copper pipe 12 of the type commonly used to distribute fresh water in buildings. It should be understood that the valve may also be applied to other fluid lines such as those constructed of rigid plastic or other materials.

Valve 10 has a valve body formed by a pair of body sections 14 and 16 which are initially separate from one another. The body sections 14 and 16 may be applied to the outside surface of pipe 12 and fit closely on the pipe when applied thereto. Body sections 14 and 16 cooperate to provide a cylindrical flow passage 18 through the valve body. The diameter of the flow passage 18 is approximately equal to the outside diameter of pipe 12, and the flow passage 18 is concentric with the water pipe. The pipe 12 extend through passage 18 when the valve body is assembled on the pipe.

A plurality of fasteners such as tapered pins 20 secure body sections 14 and 16 to one another and to the water pipe 12 in the assembled condition of the valve. As best shown in FIG. 1, the pins 20 are extended through tapered holes 21 formed in mating flanges 22 formed on the opposite sides of the valve body sections 14 and 16. A wedge shaped retaining pin 23 is driven tightly through each pin 20 to act in wedging fashion against the underside of the flange 22 on body section 16. This wedging action assures that pins 20 are fully inserted through and retained in holes 21, and the tapered shapes of pins 20 assures that body sections 14 and 16 are precisely positioned and aligned with one another. Connection of the body sections may be accomplished in other ways, such as by locking rings, splines or other fasteners, including glue and other bonding agents.

Flat gaskets 24 (see FIG. 4) are sandwiched and compressed between the flanges 22 in order to seal them together. Additional gaskets 26 seal the valve body sections 14 and 16 to the outside surface of the water pipe 12 at locations on opposite sides of a valve chamber 28 which is formed within the valve body. The valve chamber 28 is substantially perpendicular to and intersects the flow passage 18. Elastomeric seals and various other types of seals may be used in place of the gaskets, and the parts may be machined precisely enough that no added seals are necessary.

A specially formed gate 30 is mounted in valve chamber 28 for reciprocating movement between the fully open position shown in FIG. 2 and the fully closed position shown in FIG. 3. In the open position of the gate, it is retracted out of the flow passage 18 to avoid obstructing flow therethrough. In the fully closed position of gate 30, it completely blocks flow through the flow passage, as shown in FIG. 3. Gate 30 has a pair of gate sections 31 which are separated by a split 32 which extends partially through the gate from its leading end. The gate sections 31 are mirror images of one another, and each has a free end which is the leading end of the gate section when it moves toward the closed position. A concave surface 33 is formed on the leading end of each gate section 31. The gate sections are connected at their trailing ends. Each gate section has a flat side 34 which seats against an annular valve seat 35 in the closed position of the gate. The valve seats 35 are machined surfaces on the valve body located on opposite sides of the valve chamber 28 and extending around the flow passage 18. They may taper slightly from top to bottom, such as by about 1° for example. The gate 30 is constructed such that internal spring pressure constantly urges gate sections 31 away from one another and toward the valve seats 35.

The lower or leading edge of each gate section is provided with a knife edge 36 located adjacent surface 33 at the edge of side 34. The edges 36 are spaced apart and are parallel. As will be explained more fully, the knife edges 36 serve to sever the water pipe 12 when the gate is initially closed.

A cavity 40 is formed in body section 16 at a location adjacent to but outside of the flow passage 18. The cavity 40 is located below passage 18 and receives the scrap which is cut away from the water pipe by the knife edges 36. A convex internal surface 42 on the valve body bounds cavity 40 and has a shape generally complemental to the shapes of the concave surfaces 33 on the leading ends of the gate sections.

The gate 30 is reciprocated between the open and closed positions by rotation of a valve stem 44 which is a shown as a rising stem. The shank of stem 44 is provided with screw threads 46 which mate with internal threads 48 formed in a valve bonnet 49 screwed onto body section 14. The stem 44 is provided with a disc 50 on its lower end which connects the stem with gate 30 while permitting the stem to turn relative to the gate. Packing 56 provides a seal between the bonnet 49 and the valve stem 44 without hindering rotation of the stem. A packing gland 58 encircles stem 44 and compresses the packing 56 when a packing nut 60 is tightened on the bonnet 49. A handle 62 is applied to the end of stem 44 and is readily accessible to facilitate turning of the stem to open and close gate 30. It should be understood that the valve can also be a nonrising stem valve.

Valve 10 may be installed on pipe 12 while the pipe remains in service and contains water or another fluid under pressure. Installation of the valve involves first applying the body sections 14 and 16 to the outside of the pipe 12 with the gaskets 24 and 26 in place. The tapered pins 20 are then applied and secured by retaining pins 23 in order to secure the body sections 14 and 16 together. This compresses the gaskets in order to effectively seal the valve body to the water pipe. The body sections 14 and 16 are also maintained in precise alignment so that the valve seats 35 present continuous surfaces.

When the valve is thus mounted on the pipe, the gate 30 is initially in the fully open position shown in FIG. 2. The valve handle 62 can then be turned to turn stem 44, thereby advancing gate 30 toward the closed position by threaded action resulting from the threaded connection between threads 46 and 48. As the gate is extended toward the closed position, the sharp knife edges 36 makes parallel cuts through the wall of pipe 12 and sever from the pipe a piece of scrap 64 in the form of a small ring located between the cuts made by edges 36. The ring which is cut away from pipe 12 is deformed by gate 30 and is forced into cavity 40 as the gate approaches the cavity. After the ring has been completely severed from the pipe, it is pushed into cavity 40 and is crushed against surface 42, as shown in FIGS. 3 and 4.

The leverage provided by the threaded connection between stem 44 and the valve body assists in advancing the gate with enough force to effect severing of the water pipe 12 and crushing of ring 64 against surface 42. As gate 30 approaches the fully closed position, the surfaces 33 which press ring 64 into cavity 40 begin to interact with surface 42. This interaction causes surfaces 33 to move away from one another by camming action due to the curvatures of surfaces 33 and 42. This movement in turn results in the lower portions of the gate sides 34 being pressed firmly against the valve seats 35. After the lower ends of gate sections 31 are firmly wedged against the valve seats, continued rotation of stem 44 causes the remainder of the gate to expand against the valve seats. In this manner, a tight mechanically forced seal is effected between each side of the gate and the valve seats 35.

After valve 10 has been installed on pipe 12 and initially closed to sever the pipe, the valve can be operated in the normal manner to control the flow of water through the pipe. When stem 44 is turned in one direction, gate 30 is raised toward the open position shown in FIG. 2. When the gate is fully opened, water can flow freely through the valve. Turning of stem 44 in the opposite direction lowers gate 30 toward the closed position shown in FIG. 3. When the gate is fully closed, it completely blocks flow passage 18 and prevents the flow of water through pipe 12. The gate can be positioned anywhere between the fully open and fully closed positions, and it will then obstruct but not completely block the flow of water through the water pipe.

The fact that valve can be installed while the water pipe 12 remains in service is particularly important. It is not necessary to cut off the water supply to pipe 12 and all of the appliances it serves. Instead, the pipe and its appliances remain in service while the valve is being installed, and there is no need to close an upstream valve or to drain the water line in order to permit the valve to be installed. The valve can also be installed by persons without plumbing skills because there is no need for precise cutting of the water line or for soldering or solvent welding of the valve to the water line.

It is an important feature of the invention that the internal spring pressure of gate 30 continuously presses the gate sections 31 away from one another and causes them and especially the knife edges 36 to scrape against the valve seats 35 each time the gate is opened or closed. Consequently, any minerals or other deposits which may build up on the valve seats are removed by the gate, and an effective seal between the gate and seats can be obtained even if the gate is open for a long period of time such that the valve seats are exposed to calcium and other minerals.

By installing a pair of the valves 10 on opposite sides of a compressor in a refrigeration system, or on opposite sides of another component of a system containing expensive fluid, the compressor or other component can be removed and replaced without the need to drain the fluid and to recharge the system. Both valves can be closed to retain the great majority of the fluid between them, and they can be opened again after the new compressor or other component of the system has been installed.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A valve for installation on a water pipe in a building while the pipe remains in service with water contained therein, said valve comprising:
   a valve body having a pair of separable body sections applicable to the exterior of the water pipe and cooperating to surround the pipe when applied thereto in an assembled condition, said body presenting a flow passage aligned with the pipe and a valve chamber intersecting with the flow passage;
   a pair of valve seats on the valve body located on opposite sides of said valve chamber;
   means for securing said body sections on the pipe in said assembled condition;
   seal means for sealing said body sections to the pipe and to one another;
   a bifurcated gate valve element mounted in said valve chamber for reciprocating movement therein between open and closed positions to respectively open and close said flow passage, said gate valve element including a pair of gate sections each having a leading end and a trailing end, said gate sections being spaced apart between said leading and trailing ends and being flexible toward and away from one another;
   a valve stem supported on said body for rotation;
   means including a threaded connection for effecting movement of the valve element by threaded action between the open and closed positions in response to rotation of the stem in opposite directions;
   a sharp edge on the leading end of each gate section for cutting through the pipe, each edge being disposed out of said flow passage in the open position of the valve element and acting to cut through the pipe adjacent the corresponding valve seat when said element is initially moved to the closed position after said body has been applied to the pipe in the assembled condition, thereby shearing a ring of scrap from the pipe;
   a cavity in the valve body located to receive the leading ends of said gate sections in the closed position of the valve element and to receive and retain said ring of scrap in a crushed condition after same has been severed from the pipe by said edges; and
   a camming surface on said valve body situated at a base end of said cavity at a location to be engaged by the leading ends of said gate sections as said valve element approaches the closed position thereof, said camming surface having a configuration that receives said scrap ring to force said leading ends away from one another by a camming action between said scrap ring and said leading ends to thereby press the gate sections against the valve seats in the closed position of the valve element.

2. A gate valve for installation on a water pipe in a building while the pipe remains in service with water contained therein, said gate valve comprising:
   a valve body presenting a flow passage accommodating fluid flow therethrough and a valve chamber intersecting with the flow passage;
   a bifurcated gate member mounted in said valve chamber for reciprocating movement therein between open and closed positions to respectively open and close said flow passage, said gate member including a pair of gate sections each having a leading end and a trailing end, said gate sections being spaced apart between said leading and trailing ends and being flexible toward and away from one another;

a sharp cutting edge on the leading end of each gate section for cutting through the pipe when the gate member is initially moved to the closed position, whereby a ring of scrap is severed from the pipe by said cutting edges;

a concave surface on the leading end of each gate section adjacent the cutting edge a valve stem coupled with said gate member to effect movement of the latter between the open and closed positions;

a pair of valve seats on the valve body located on opposite sides of the valve chamber; and a convex camming surface on said valve body adjacent the valve chamber at a location to interact with said concave surfaces on the leading ends of the gate sections as said gate member approaches the closed position, said convex camming surface having a configuration that receives said scrap ring to force said leading ends away from one another by a camming action between said scraping and said leading ends to thereby press the gate sections against the valve seats in the closed position of the gate member, said leading ends of the gate sections acting to crush said ring of scrap against said camming surface to maintain the scrap out of the flow passage when the gate member is subsequently moved to the open position.

* * * * *